United States Patent [19]

Jabs et al.

[11] 3,873,476

[45] Mar. 25, 1975

[54] HYDROPHILIC POLYURETHANE FOAM

[75] Inventors: Gert Jabs, Schildgen; Gunther Loew, Leichlingen, both of Germany

[73] Assignee: Bayer Aktiengesellschaft, Leverkusen, Germany

[22] Filed: Oct. 23, 1973

[21] Appl. No.: 408,983

[30] Foreign Application Priority Data
Nov. 3, 1972  Germany............................ 2253943

[52] U.S. Cl....260/2.5 AD, 260/2.5 AG, 260/2.5 AP, 260/2.5 AQ, 260/2.5 AT
[51] Int. Cl... C08g 22/44, C08g 22/14, C08g 22/28
[58] Field of Search... 260/2.5 AD, 2.5 AQ, 2.5 AP, 260/2.5 AG, 2.5 AT

[56] References Cited
UNITED STATES PATENTS

| | | | |
|---|---|---|---|
| 3,112,281 | 11/1963 | Gromacki | 260/2.5 AQ |
| 3,489,698 | 1/1970 | Morehouse | 260/2.5 AG |
| 3,558,529 | 1/1971 | Whitman | 260/2.5 AP |
| 3,706,678 | 12/1972 | Dietrich | 260/2.5 AT |
| 3,793,241 | 2/1974 | Kyle | 260/2.5 AD |
| 3,799,898 | 3/1974 | Lamplugn | 260/2.5 AD |

Primary Examiner—Donald E. Czaja
Assistant Examiner—C. Warren Ivy
Attorney, Agent, or Firm—Gene Harsh

[57] ABSTRACT

An open-cell, hydrophilic polyurethane foam having a high compression strength and a high water retention capacity which foam is suitable for use as a substrate for cut flowers and which foam is obtained from reaction of a polyisocyanate and a mixture of two different type polyhydroxyl compounds while in admixture with an emulsifier and a blowing agent.

5 Claims, No Drawings

HYDROPHILIC POLYURETHANE FOAM

This invention relates to a process for the production of open-celled, hydrophilic polyurethane foams and to the use of these foams as substrates for the insertion of cut flowers.

The production of hydrophilic polyurethane foams is already known (German Offenlegungsschrift No. 2,004,518). Although the hydrophilic foams obtained by this process have a very high water absorption capacity, their capacity for retaining water, as tested by the method described hereinafter, is below 30%. For this reason and because of their low compression strength of about 200 p/cm², which is due to their low density, the foam resins obtained according to German Offenlegungsschrift No. 2,004,518 are hardly suitable for use as substrates for cut flowers.

A process has now been found for the production of open-celled polyurethane foams which are eminently suitable for use as substrates for cut flowers by virtue of their excellent water absorption and retention capacity and their very high mechanical strength.

This invention relates to a process for the production of open-celled, hydrophilic polyurethane foams which have a density of from about 15 to about 40 kg/m³ from a polyisocyanate, polyhydroxyl compounds, water and/or other blowing agents, emulsifiers and optionally other auxiliary agents and additives, which is characterized in that 1. the polyhydroxyl compounds used are mixtures of
   a. from about 50 to about 90 per cent by weight, based upon the total quantity of polyhydroxyl compounds, of polyhydroxyl compound with an OH-number from about 300 to about 1820, in which at least about 50% of the hydroxyl groups are primary hydroxyl groups and/or which contain tertiary amino groups in the molecule, and
   b. from about 50 to about 10 per cent by weight, based on the total quantity of polyhydroxyl compounds, of polyhydroxyl compound with an OH-number in the region from about 25 to about 250, which is free from amine nitrogen, which contain at least about 20 mol per cent of ethylene oxide units and in which at least about 40% of the hydroxyl groups are secondary hydroxyl groups;
2. the polyisocyanate is a biuret polyisocyanate, present in a quantity which corresponds to from about 35 to about 70% of the quantity theoretically required for reacting with all of the active hydrogen atoms present in the reaction mixture which are reactive with isocyanate groups; and
3. the emulsifier is a neutral and/or ionic emulsifier present in proportions from about 2 to about 20 per cent by weight, based on the total reaction mixture.

The foam resins obtainable by the process according to the invention have a density from about 15 to about 40 kg/m³, preferably less than about 30 kg/m³, are distinguished by a compression strength of at least about 300 p/cm², preferably at least about 350 p/cm², and have a water absorption capacity, as determined by the test method described hereinafter, of at least about 80 vol % after 10 minutes storage in water, and a water retention capacity, as determined by the test method described hereinafter, of at least about 60 vol % after 24 hours storage. On account of these properties, the foam resins obtainable by the process according to the invention are eminently suitable for use as substrates for cut flowers.

The present invention, therefore, also relates to the use of foam resins obtainable by the process according to the invention as substrates for cut flower arrangements.

The polyhydroxyl compounds (1 a) used in the process according to the invention are preferably mixtures of polyhydroxyl compounds which mixtures have average OH-numbers in the region from about 300 to about 1820, preferably at least about 350 and more preferably at least about 400, which mixtures are highly reactive with isocyanate groups. The high reactivity of these mixtures is due to the fact that at least about 50 % of their hydroxyl groups are primary hydroxyl groups and/or that they contain tertiary amino groups which catalyze the NCO/OH reaction. In the process according to the invention, the polyhydroxyl compounds (1 a) are used in quantities from about 50 to about 90 per cent by weight, and preferably from about 60 to about 80 per cent by weight, based on the total hydroxyl component.

Examples of suitable polyhydroxyl compounds (1 a) are: ethylene glycol, propylene-1,3-glycol, butane-1,3-diol, butane-1,4-diol, diethylene glycol, triethylene glycol, glycerol, 1,1,1-trimethylol propane and especially addition products of up to 0.5 mol of propylene oxide per equivalent hydroxyl groups with low molecular weight polyols containing up to about 10, perferably up to about 6 or 8, carbon atoms, such as those mentioned above, and/or addition products of 4 – 6 mols of ethylene oxide and/or propylene oxide with ammonia or primary amines containing up to about 10, preferably up to about 6 or 8, carbon atoms such as ethanolamine, aniline or ethylene diamine.

The polyhydroxyl compounds (1 b) used for the process according to the invention are free from amine atoms, have OH-numbers in the region from about 25 to about 250, preferably less than about 150 and more preferably less than about 75, have at least about 40 %, preferably at least about 50 %, of the hydroxyl groups in the form of secondary hydroxyl groups, and contain at least about 20 mol per cent, preferably from about 40 to about 60 mol per cent, of ethylene oxide units. The polyhydroxyl compounds (1 b) are used in the process according to the invention in quantities from about 10 to about 50 per cent by weight, preferably from about 20 to about 40 per cent by weight, based on the total quantity of polyhydroxyl compounds used. Preferably, these (1 b) polyhydroxyl compounds are hydrophilic polyhydroxy polyethers. Mixtures of these compounds may also be used.

Examples of such polyhydroxyl compounds (1 b) are: ethoxylation products of suitable starter molecules, such as e.g. water, ethylene glycol, trimethylol propane or glycerol, and such ethylene oxide addition products to which propylene oxide units are grafted at the end positions, or addition products of ethylene oxide/propylene oxide mixtures with the aforesaid starter molecules, in which the molar ratio of ethylene oxide to propylene oxide is between about 1:3 and about 1:1.

It is necessary in the process of the invention that biuret containing polyisocyanates be employed although the presence of some polyisocyanates which do not contain biuret groups is acceptable and, at times, is convenient. In any event, however, at least about 50 mol % and preferably at least about 70 mol % of the polyisocyanates present in the process contain biuret groups. When non-biuret containing polyisocyanates are present, it is preferred that they be of the type upon which the biuret polyisocyanates are based. Polyisocyanate mixtures of this type can be obtained by partly biuretizing polyisocyanates, i.e. reacting only a portion of the polyisocyanate present, by techniques well known in the art such as, for example, as described in U.S. Pat. No. 3,124,605. Generally, such biuretizing can be carried out by reacting a diisocyanate with water, using a molar ratio of diisocyanate to water of at least 3 : 1, a temperature from about 80° to about 160°C and preferably, in the presence of an emulsifier, e.g. an ethoxylated phenol. When utilizing mixtures of partly biuretized polyisocyanate, it is particularly preferred to employ partly biuretized tolylene-2,4-diisocyanate or partly biuretized mixtures of tolylene-2,4-diisocyanate and tolylene-2,6-diisocyanate. The polyisocyanate component is used in the process according to the invention in a quantity which corresponds to 35 – 70 % of that theoretically required quantity for reacting with all of the hydrogen atoms present in the reaction mixture which are reactive with isocyanate groups.

Surface-active additives are also used in the process according to the invention in proportions of 2 – 20% by weight, preferably at least about 5% by weight, and preferably no more than about 10% by weight, based on the total reaction mixture. Suitable emulsifiers used in the process are e.g. arylalkyl polyethers, sulphonated arylalkyl polyethers, sodium salts of ricinoleic sulphonates or fatty acids or salts of fatty acids with amines such as oleic acid diethylamine or stearic acid diethanolamine. Alkali metal or ammonium salts of sulphonic acid, e.g. dodecyl benzene sulphonic acid or dinaphthyl dimethane disulphonic acid or fatty acids such as ricinoleic acid or of polymeric fatty acids are also particularly suitable. The use of these emulsifiers as foam stabilizers inter alia is known per se but their use, particularly in such larger quantities, as substances for increasing the hydrophilic character of polyurethane foams is new.

Water in quantities from about 2 to about 15, preferably from about 4 to about 10, parts by weight per 100 parts by weight of polyol mixture and/or readily volatile halogenated hydrocarbons in quantities from about 5 to about 25, and preferably less than about 20, parts by weight per 100 parts by weight of polyols plus polyisocyanates, can be used as blowing agents in the process according to the invention. The halogenated hydrocarbons suitable for employment are those well known in the art as blowing agents and generally comprise materials which are gaseous at room temperature and which contain no more than 3 carbon atoms, preferably no more than 2 carbon atoms and more preferably contain a single carbon atom. Particularly preferred are chlorine and fluorine substituted compounds wherein at least half, and preferably all, of the hydrogen atoms have been replaced by halogen atoms. Illustrative of suitable materials of this class are dichloromethane, dichlorodifluoromethane and, especially, monofluorotrichloromethane.

Activators known per se may be used in the process according to the invention, especially tertiary amines such as N,N-dimethyl benzylamine, triethylamine or triethylene diamine.

Stabilizers which are particularly suitable for the process according to the invention are the usual compounds based on polysiloxanes used for the production of polyurethane foams.

The foam stabilizers used are mainly water-soluble polyether siloxanes. The structure of these compounds is generally such that a copolymer of ethylene oxide and propylene oxide is attached to a polydimethylsiloxane radical. Such foam stabilizers have been described e.g. in U.S. Pat. Nos. 2,834,748 and 3,629,308, and preferably have the formula

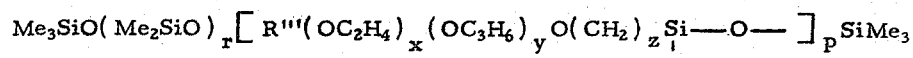

wherein
Me is a methyl group,
$r$ has a value from 3 to 25 inclusive,
R''' is hydrogen or an alkyl group containing from 1 to 4 carbon atoms inclusive,
$x$ has a value from 1 to 25 inclusive (preferably from 4 to 25 inclusive),
$y$ has a value from 0 to 15 inclusive,
at least 25 weight-percent (preferably at least 50 weight-percent) of the groups represented by $-(OC_2H_4)_x(OC_3H_6)_y-$ are oxyethylene groups,
$z$ has a value from 2 to 3 inclusive and
$p$ has a value from 1 to 10 inclusive.

Specific siloxane-oxyalkylene copolymers that can be employed as foam stabilizers in this invention are those having the average formulae:

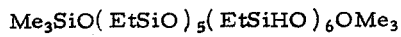

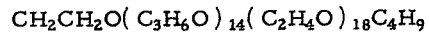

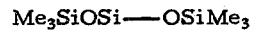

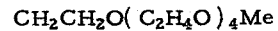

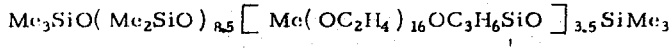

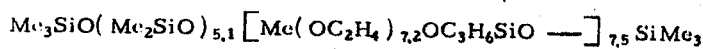

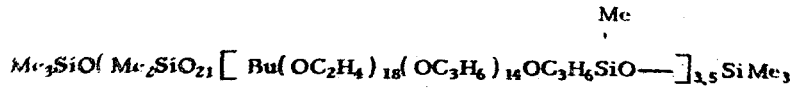

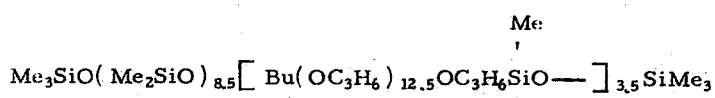

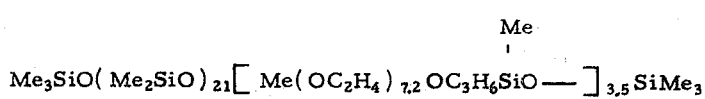

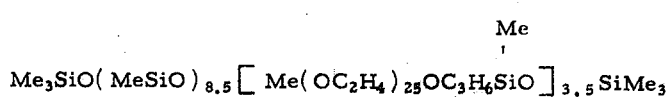

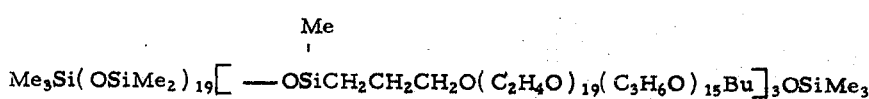

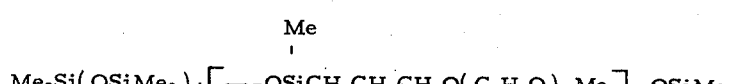

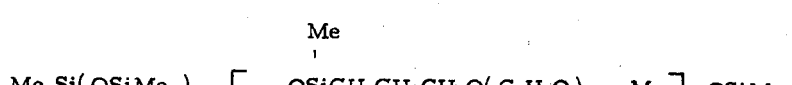

In the above formulae "Me" represents the methyl group, "Et" represents the ethyl group and "Bu" represents the butyl group.

Due to the nature of the polyhydroxyl compounds used and the presence of a subequivalent quantity of isocyanate compounds, a rapid reaction of the reactive polyol component with the isocyanate sets in and most of the polyisocyanate is used up with the formation of a polyurethane structure so that little if any of the less reactive hydrophilic polyol component can enter into a reaction with the polyisocyanate. The hydrophilic character of the resulting foam is consequently increased due to the presence of free hydroxyl groups and to the hydrophilic polyol component which is mostly present in an unbound form in the foam structure. Quicker wetting is achieved by the addition of surface-active additives.

The reactants can be reacted together by any of the techniques known per se, such as, for example the one-stage process, using a manual or mechanical method.

The hydrophilic properties of the foam resins obtainable by the process according to the invention may be determined by the following methods, using, e.g. test samples measuring 240 × 110 × 75 mm:

1. Wetting time

The sample is floated on the surface of the water. The time taken for the foam to become completely soaked with water until the top surface of the block is completely wetted is measured.

2. Water outflow time

After 1 hour's storage in water, the saturation equilibrium weight has become established and the sample is removed from the water. The water in the cut pores and coarse cells is drained off while the block is placed diagonally. The time taken between the removal of the block from the water and the termination of dripping is taken as the water outflow time.

3. Water absorption capacity:

The sample is weighed after determination of the water outflow time. The water absorption is obtained by calculating the difference in weight obtained in this weighing and the weight of the dry sample.

4. Water content after 24 hours (water retention capacity):

After the weighing described in 3 above, the sample is kept for 24 hours on one longitudinal edge at a relative humidity of 70% and a temperature of 20°C. The water content is then determined by weighing again.

Other details of the invention and the properties determined in the polyurethane foams according to the invention may be found in the following Examples. The parts given are parts by weight.

EXAMPLE 1

20 parts of a polyether of ethylene diamine and propylene oxide (OH-number 630), 10 parts of a polyether of 1,1,1-trimethylol propane and propylene oxide (OH-number 930), 15 parts of glycerol, 10 parts of diethylene glycol, 5.5 parts of water, 30 parts of a polyether of glycerol, ethylene oxide/propylene oxide (1 : 1) (OH-number 56), 10 parts of an emulsifier mixture of 50% of an arylalkyl polyether of 1 mol of 4-hydroxy diphenylmethane and 17 mols of ethylene oxide and 50% of dodecyl benzene sulphonic acid monoethanolamine and 1.5 parts of polysiloxane stablilizer (L 5310 of UCC) are stirred together. The stabilizer is believed to be a polysiloxane-polyalkylene glycol having the average formula:

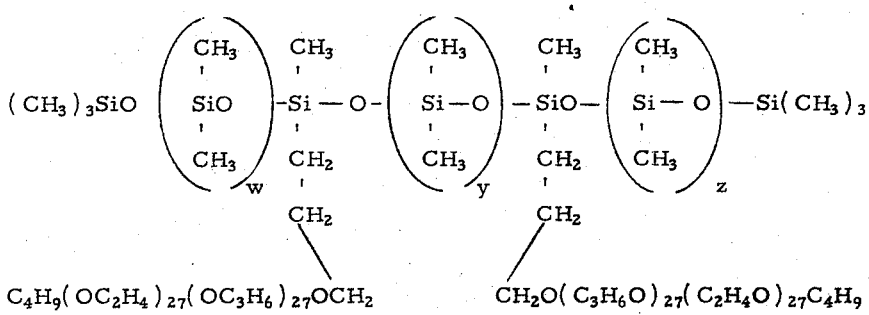

where the sum of $w$, $y$ and $z$ is about 16.

This mixture is then admixed with 95 parts of an isomeric mixture of 80% 2,4-and 20% 2,6-tolylene diisocyanate which has been partly biuretized by reacting the diisocyanates with water to provide a partly biuretized material comprising about 33.3% by weight NCO, which material has previously been stirred up with 10 parts of monofluorotrichloromethane. The admixture then reacts to form a solid polyurethane foam and the foam is subjected to testing. The results of the testing are tabulated in Table I below.

EXAMPLE 2

15 parts of a polyether of ethylene diamine and propylene oxide (OH-number 630), 10 parts of glycerol, 5 parts of diethylene glycol, 10 parts of a polyether of 1,1,1-trimethylol propane and propylene oxide (OH-number 550), 5 parts of water, 10 parts of a polyether of glycerol and an ethylene oxide/propylene oxide mixture (ratio 1 : 1) with OH-number 56, 10 parts of an emulsifier mixture of 50% of an arylalkyl polyether of 1 mol of 4-hydroxy diphenylmethane and 17 mols of ethylene oxide and 50% of dodecyl benzene sulphonic acid monoethanolamine and 2 parts of the polysiloxane stabilizer of Example 1 are stirred together. This mixture is then admixed with 100 parts of the partly biuretized tolylene diisocyanate of Example 1 to which 10 parts of monofluorotrichloromethane have previously been added. The admixture then reacts to form a solid polyurethane foam and the foam is subjected to testing. The results of the testing are tabulated in Table I below.

EXAMPLE 3

20 parts of a polyether of ethylene diamine and propylene oxide (OH-number 650), 20 parts of a polyether of ammonia and propylene oxide (OH-number 590), 20 parts of a polyether of 1,1,1-trimethylol propane and an ethylene oxide/propylene oxide mixture (1 : 1) followed by 30 mols of propylene oxide, based on 1 mol of polyether (OH-number 42), 1.5 parts of water, 20 parts of monofluorotrichloromethane, 3 parts of a ricinoleic sulphonate and 2 parts of the polysiloxane stabilizer of Example 1 are stirred together. This mixture is then admixed with 40 parts of the partly biuretized tolylene diisocyanate of Example 1. The admixture then reacts to form a solid polyurethane foam and the foam is subjected to testing. The results of the testing are tubulated in Table I below.

TABLE I

PROPERTIES OF THE FOAM RESINS OBTAINED

| Example | 1 | 2 | 3 |
|---|---|---|---|
| Density kg/m³ | 27 | 19 | 24 |
| Compression strength kp/cm², saturated with water | 400 | 420 | 386 |
| Wetting time minutes* | 4–10 | 2–8 | 10–12 |
| Quantity of water absorbed* vol - % | ≧80% | ≧80% | ≧85% |
| Water content after 24 hours* vol - % | ≧70% | ≧70% | ≧75% |

*The hydrophilic properties were determined on a plurality of test samples measuring 240 × 110 × 75 mm as described above.

EXAMPLE 4

A test sample measuring 240 × 110 × 75 mm was cut out of the polyurethane foam obtained according to Example 1. It was placed with its broad side downwards in a vat, the bottom of which was covered with a layer of water 1 cm deep. Chrysanthemums with their stalks cut to a length of about 25 cm were inserted in this test sample in such a manner that the lower 7.5 cm of each stalk was inserted in the foam. The flowers only faded after 22 days at room temperature.

What is claimed is:

1. An open-celled, hydrophilic polyurethane foam having a density from about 15 to about 40 kg/m³, a compression strength of at least about 300 p/cm² and a water retention capacity of at least about 60 vol %, which polyurethane foam is obtained from the reaction of aliphatic polyhydroxyl compounds and a polyisocyanate while in admixture with a non-silicon containing emulsifier and a blowing agent where:
1. the polyhydroxyl compounds are a mixture of
 a. from about 50 to about 90% by weight, based upon the total quantity of polyhydroxyl compounds, of a polyhydroxyl compound which has an OH-number from about 300 to about 1820 and which has either
  1. at least about 50% of the hydroxyl groups in the form of primary hydroxyl groups,
  2. tertiary amino groups in the molecule, or
  3. both 50% primary hydroxyl groups and tertiary amino groups, and
 b. from about 50 to about 10% by weight, based upon the total quantity of polyhydroxyl compounds, of a polyhydroxyl polyether compound which is free from amine nitrogen atoms, which has an OH-number from about 25 to about 250, which contains at least about 20 mol % of ethylene oxide units and in which at least about 40% of the hydroxyl groups are secondary hydroxyl groups;
2. at least 50 mol % of said polyisocyanate contains biuret groups and said polyisocyanate is present in a quantity which corresponds to from about 35 to about 70% of the quantity theoretically required for reacting with all of the active hydrogen atoms in the reaction mixture with isocyanate groups; and
3. where the emulsifier is selected from the group consisting of neutral and ionic emulsifiers which increase the hydrophilic character of the foam and is present in a quantity from about 2 to about 20% by weight based upon the total reaction mixture.

2. The composition of claim 1 wherein the polyhydroxyl compound (1 a) is used in a quantity from about 60 to about 80% by weight based on the total hydroxyl component, and the polyhydroxyl compound (1 b) is used in quantity from about 20 to about 40% by weight based upon the total hydroxyl component.

3. The composition of claim 1 wherein at least about 50% of the hydroxyl groups in the polyhydroxyl compound (1 b) are in the form of secondary hydroxyl groups.

4. The composition of claim 1 wherein the polyhydroxyl compound (1 b) contains from about 40 to about 60 mol % of ethylene oxide.

5. A substrate for cut flower arrangement comprising the polyurethane foam of claim 1.

* * * * *